Oct. 11, 1966   E. JAULMES   3,278,221
COLLAPSIBLE VEHICLE
Filed March 25, 1964   2 Sheets-Sheet 2
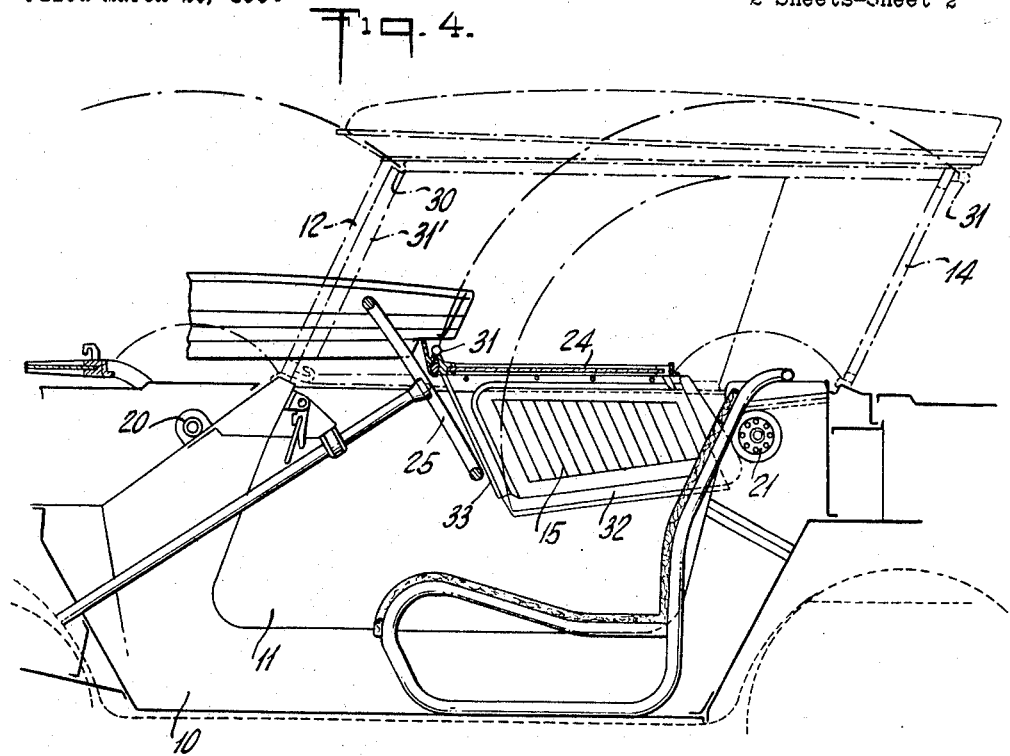
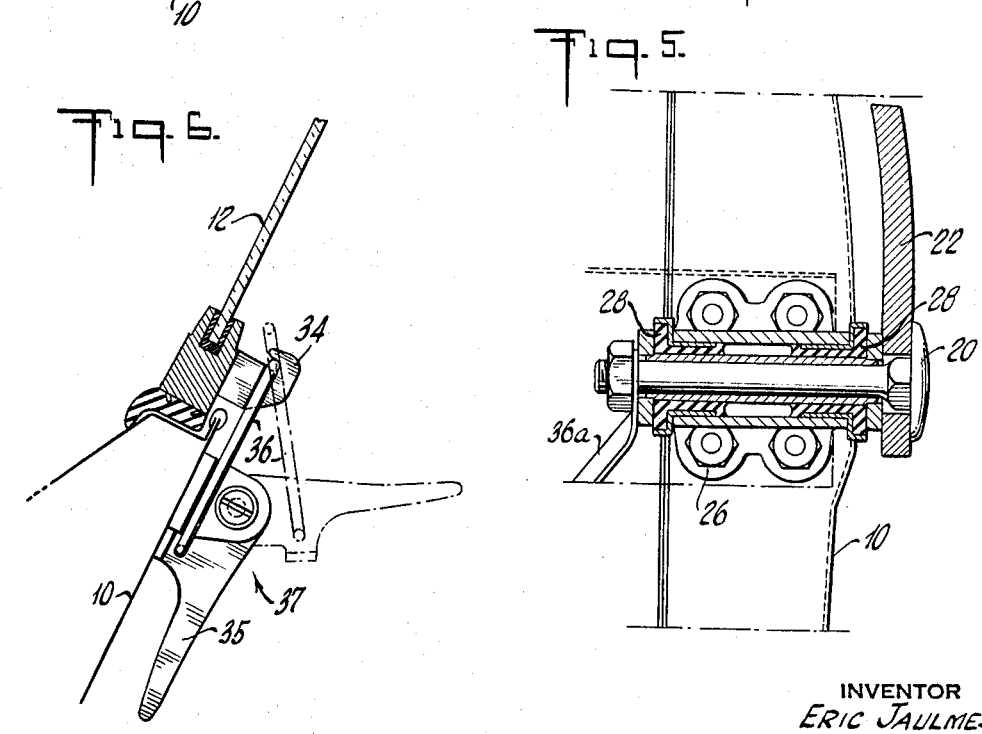
INVENTOR
ERIC JAULMES
BY   KARL RATH
ATTORNEY

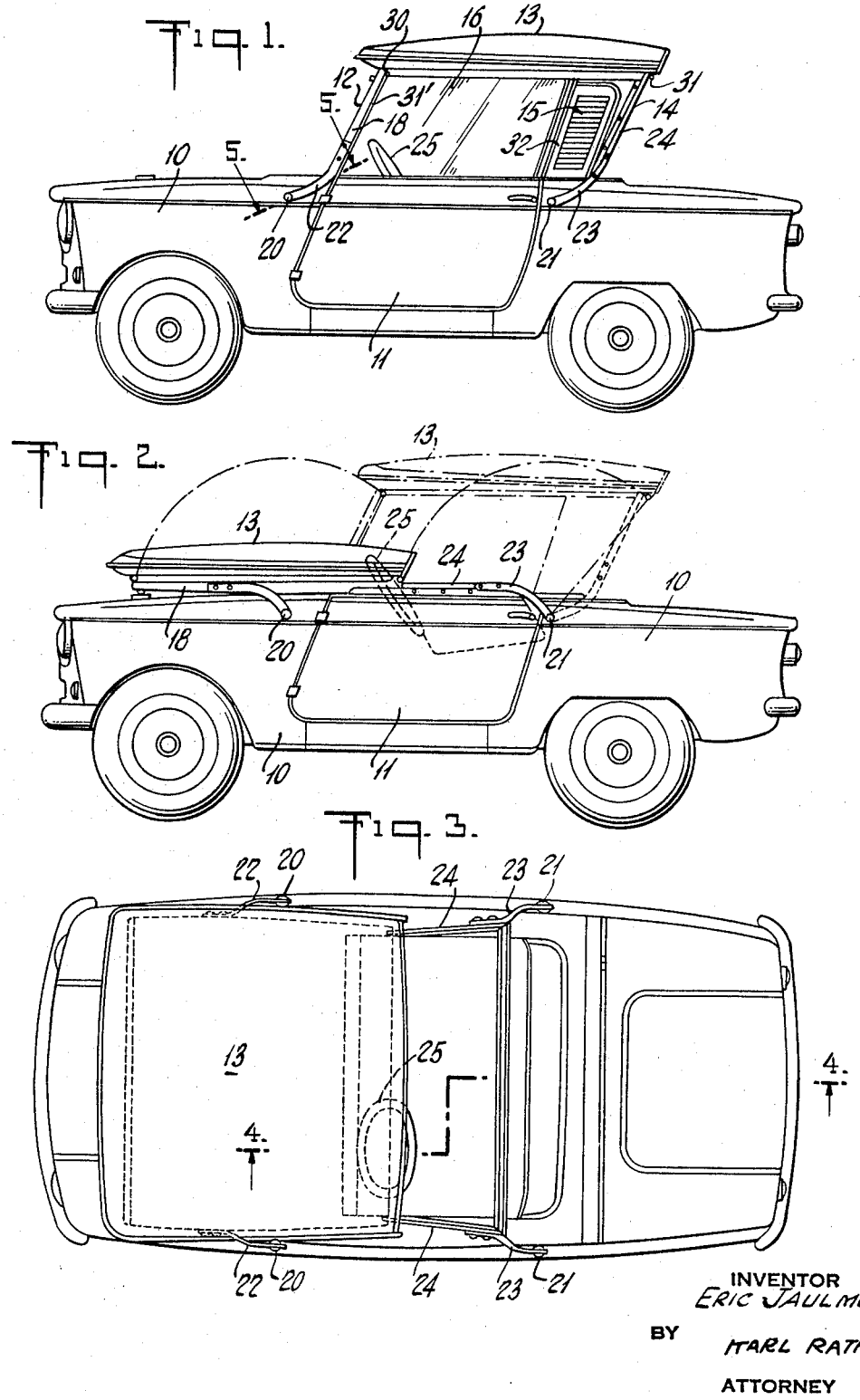

United States Patent Office 3,278,221
Patented Oct. 11, 1966

3,278,221
COLLAPSIBLE VEHICLE
Eric Jaulmes, Paris, France, assignor to Ateliers de la Motobecane, a corporation of France
Filed Mar. 25, 1964, Ser. No. 354,565
Claims priority, application France, Apr. 3, 1963, 930,712
4 Claims. (Cl. 296—27)

The present invention relates to a collapsible, preferably automotive, vehicle designed to reduce the vertical bulk thereof in the non-use position for ease and economy in storing and/or transporting the same without its own power.

Until the present, the solutions proposed to the problem of urban vehicles have always resulted more or less in the concept of minimum occupied ground area, while giving a very particular priority to the reduction of the longitudinal extent of the vehicle.

This approach to the problem, dictated by considerations of parking on the public road, and leading to the production of short vehicles, presents various fatal difficulties. In the first place, the solution of the very short vehicle is inoperative in the case of total prohibition of parking on the highway, a measure very widely adopted in the centre of large conurbations, and which is likely to become more general. In the second place, the use in traffic of short vehicles can only delay the point of saturation of main roads which remain available to parking. Finally, very short vehicles do not sufficiently guarantee the bodily safety of the user in case of frontal collision, the ankles and vertebral column of the occupants being too close to the ends of the vehicle. In fact, it must now be admitted that the highways will be in future devoted to traffic properly so called and, on the most favorable hypothesis, only to temporary waiting, permanent parking being however allowed only in areas specially designed for that purpose, and located off the public highway.

Now, in the present condition of large cities, the available ground area being notoriously insufficient to provide the parking needs of cars, the only possibility of increasing permanent parking lies in vertical extension, or garages of multiple storey below or above ground, in which the vehicles are placed one above another, preferably as close as possible.

It will be appreciated that, under these conditions, the town vehicle of the future, while having a length reduced as far as possible, but nevertheless compatible with the most elementary rules of safety and bodily protection, should in addition comply with a minimum vertical extent.

An important object of the present invention is, therefore, the provision of means permitting this new requirement to be satisfied. With this object in view, it concerns principally a closed four-wheel and preferably two-door vehicle, of coupe type (two doors—two windows) or sedan type (two doors—four windows) the height of which in the collapsible or garaging position is much less than its height in the operating or road position, which allows a much larger number of such vehicles to be housed in a garage of given height or depth or, conversely, to reduce the height or depth of the garage, and in consequence the corresponding cost of its construction, for the same capacity of vehicles.

For this purpose, and according to a preferred embodiment of the invention, the more or less conventional superstructure of an automotive vehicle constituted essentially by the roof, the windshield and the rear window is actuated to move from its normal or road position to a lowered or collapsed position, in which the windshield rests on the hood of the vehicle, and the roof on the windshield, the vertical extent of the vehicle thus being limited in practice by the height of the steering wheel and the back-rest of the seat.

Of course, the vehicle in collapsed position cannot be driven, but it lends itself most particularly to use of automatic garages in which each vehicle, brought onto a platform at ground level, is carried to the level of the chosen garage, then moved into a cell preferably by automatic means, the removal of the vehicle being carried out by the converse sequence of operations.

While the collapsible vehicle forming the subject of the invention is designed primarily with the parking or garaging problem in mind, it will be understood that the reduced space of the vehicle in the collapsed position may be of advantage generally in connection with the storing of the vehicle where space is at a premium during both limited and extended time periods, as well as during shipment by rail or truck. In this connection, reference is made to the increasing custom of traveling in part by car and in part by rail by transporting the car ahead of or by the same train taken by the tourist or traveler.

The vehicle with lowering superstructure which is the subject of the invention is particularly characterized by the fact that its windshield, its roof, and its rear window form three faces of a jointed parallelopiped, the windshield and the rear window being movable from their erect position, or road position in which they are parallel and inclined towards the rear, to a folded or collapsed position in which the windshield is laid horizontally on the hood of the vehicle, the rear window being itself laid horizontally behind the windshield thus covering the seat, while the roof rests on the windshield and, in this position, comes to cover the steering wheel.

The lateral faces of the jointed parallelopiped thus formed are defined by the parallel uprights of the windshield and of the rear window which, also according to the invention, turn around two horizontal pivots fixed in the body of the vehicle within a common horizontal plane and placed respectively in front of and behind the door openings on each side of the vehicle.

According to a further feature of the invention, hinging arms which prolong downwards the uprights of the rear window place themselves in the folded or collapsed position, in such a way that they block the inopportune opening of the doors which might interfere with, or render impossible, the introduction of the vehicle into and removal from the cell of the garage, or other storage space. Conversely, and thanks to this device, the jointed superstructure cannot be lowered into the garaging position unless the doors are properly closed.

The windows of the doors are of the free standing type, that is to say without any frame rigid with the leaf of the door, thus leaving nothing standing as an obstacle above the waist line of the body when the windows are lowered, and thus permitting the free lowering of the roof and rear window towards the front to the collapsed position.

Still according to the invention, while the seals or elastic water-tight strips at the front of the windows of the doors are fixed directly to the right and left uprights of the windshield, those which correspond to the rear part of the door windows are fixed to quarter panels (in the case of a coupe) or to quarter windows (in the case of a sedan) which are rigid only with the right and left uprights of the rear window and which, in accordance with an important feature of the invention, are arranged so that they disappear against the doors in the interior of the body in the folded position.

According to a further feature of the invention, the lower joints of the superstructure, pivoting on the body, are mounted on rubber, so as to provide an electric insulation between the jointed superstructure and the body. Independently from tkaing care of avoiding noise resulting from possible play in these hinges, there is thus provided means for preventing the starting of the engine, and the moving of the vehicle, before closing latches for locking the superstructure in the road position, on the one hand, and the unexpected and violent collapse of the superstructure on the back of the neck of the driver, on the other hand, by the effect of inertia, on the first application of the brake.

For this purpose, the earth lead connected to the battery is connected to the central metal shaft of one of these pivots which, via the metal upright of the windshield, leads the electric current to one of the parts of the locking latch fixed to this upright. The other part of the locking latch being fixed to the main body, only the closing of this latch permits closing of the earth circuit and, in consequence, the starting of the engine. Conversely, the opening of the locking latches of the windshield, necessary to allow the change from road position of the superstructure to its lowered position, automatically breaks the electric circuit of the vehicle, even if one supposes that the user might have, by oversight, neglected to turn off the ignition key, thus ensuring automatic security against the risk of fire, which is especially to be feared in a vehicle intended to be housed in very large numbers in a very restricted space (a silo garage).

The invention, both as to foregoing and ancillary objects as well as novel aspects thereof, will be better understood from the following detailed description of a preferred practical embodiment in the form of a four-wheel vehicle of "coupe" type, taken in conjunction with the accompanying drawings forming part of this specification and in which:

FIG. 1 shows, in side elevation and in the extended or road position, the vehicle constructed in accordance with the principles of the invention;

FIG. 2 shows the vehicle of FIG. 1 in the collapsed or garaging position;

FIG. 3 is a plan view of FIG. 2;

FIG. 4 is an enlarged partial view showing a longitudinal vertical section taken on line 4—4 of FIG. 3;

FIG. 5 is a detailed sectional view, taken on an enlarged scale on line 5—5 of FIG. 1 and illustrative of an improved feature of the invention; and FIG. 6 is a further detailed view showing in side elevation a latch forming a component part of the feature shown by FIG. 5.

Like reference numerals denote like parts in the different views of the drawings.

Referring more particularly to FIGS. 1–4, the body 10 of the vehicle described and shown, although possessing the characteristic shape and conventional construction, does not have any specific original feature and it will therefore not be described in greater detail below. The same applies to the doors indicated at 11.

The jointed and lowering superstructure which constitutes essentially the subject of the present invention comprises the windshield 12, the roof 13, the rear window 14, and by the quarter panels 15 occupying the space between the rear window and the door windows in the extended or road position.

At the front and at the rear of the opening for the doors 11, the body 10 carries horizontal pivots 20, 21 located in a common plane. On the pivot 20 there is jointed a bent arm 22 which extends downwards from the lateral uprights 18 of the windshield 12. In the same manner, bent arms 23, extending downwards from the lateral uprights 24 of the rear window 14, are joined on the pivots 21.

According to a further feature of the invention, the uprights 18 and 24 are parallel and of the same length, as also are the arms 22 and 23. They form in consequence the two opposite sides of a jointed parallelopiped of which the third side is constituted by the roof 13. Under these conditions, the latter can be moved, by pivoting about the axes 20, 21, from the road position shown in FIG. 1 to the collapsed position shown in FIG. 2, in which, with the windshield 12 being laid on the hood of the vehicle, the roof 13 rests on the latter, the rear window 14 being laid horizontally behind the windshield and covering the driver's seat. In other words, the roof 13 in the collapsed position comes to cover the steering wheel 25, FIGS. 2 and 3, the upper point of which determines in practice the vertical bulk of the vehicle.

As more clearly shown in FIG. 5, the pivot 20 turns in a sleeve 26 bolted to the body 10 by the intermediary of rubber cushions 28 devoid of restoring moment, similar to those known under the trade name "Fluidblock," whereby to ensure the silence of the joint whatever may be its degree of wear. The mounting of the rear pivots 21 for the arms 23 is carried out in the same way as for the pivots 20.

At their upper extremity, the uprights 18, 24 of the windshield and of the rear window are jointed to the roof 13 by means of identical hinges 30 and 31, respectively.

The windows 16 of the doors 11 are of the free-standing type thus leaving, when in the lowered position, no projection above the upper edge of the doors capable of interfering with the complete lowering of the roof and the rear window. The mechanism for raising and lowering these windows may be of standard type (not shown).

The seals or elastic sealing strips at the front of the windows, indicated at 31', FIGS. 1 and 4, are directly fixed to the uprights 18 of the windshield. Similarly, elastic sealing strips 32 at the rear of the windows, being parallel to said first strips in the road position, are fixed at the front or free edge of the quarter panels 15 the arrangement of which constitutes another of the original features of the vehicle which is the subject of the invention. In fact, it is necessary that the panels ensure the water-tightness of the superstructure 12, 13, 14 in the road position, and that they take up a position within the body 10 in the collapsed position of the vehicle. The width of the body being greater than that of the superstructure, practical difficulties arise which are overcome thanks to the arrangement described in the following.

As is shown more particularly in FIG. 4, the quarter panels 15 are only attached to the uprights 24 of the rear window while as already pointed out their opposite free edges carry the sealing strips 32 the lips of which, turned outwards, make a seal against the internal face of the windows 16 in road position. The upper edge 33 of the quarter panels in the road position cooperates with a water-tight joint forming at the same time an elastic bed for the roof 13, while lower edge of the quarter panels 16 is itself engaged in the road position against another water-tight seal fixed to the body 10. The quarter panels 15 thus function, in the road position, as abutuments, stopping rearward movements of the roof 13.

To permit the engagement of the lower edge of the quarter panels 15 against the last-mentioned seal on the body 10, it will be seen that their pivots 21 are practically below the front edge of the panels.

In order to enable the panels 15 to be positioned in the collapsed position against the insides of the doors 11, the uprights 18 and 24, as well as the windows 16, are slightly inclined in the inward direction, as more clearly seen from FIG. 3, that is, the superstructure has a trapezoidal shape or configuration.

According to a furtner feature of the invention, means are provided to prevent any inopportune operation either in changing to the collapsed position or in changing to road position respectively.

In the first place, in order to prevent the opening of the doors in the collapsed position of the vehicle, which among other defects, would be capable of interfering with or rendering impossible the introduction of the vehicle into its garage cell, or to cause damage thereto, the arms 24 extending from the lateral uprights of the rear window are so shaped, FIG. 3, and their pivot 21 is so placed with respect to the door openings, that the arms in the collapsed position come into place against the exterior face of the doors which are thus automatically blocked.

In the second place, latches 37, FIG. 6, serve to lock the windshield 12 to the body 10. These latches, being of any appropriate type, but preferably of stirrup shape as shown, include a part 34 fixed to the uprights 18 of the windshield on the inner face of the latter, and a part 35 fixed to the body 10, their stirrup being indicated at 36. They prevent, for example in the case of abrupt braking, unexpected and violent collapse of the superstructure on the back of the neck of the driver by the effect of inertia.

Finally, means are provided, in accordance with the invention, for preventing the starting of the engine before completion of the latching of the superstructure described in the foregoing. For this purpose, the pivots 20 and 21 are electrically isolated from the body 10, it being seen that this insulation is easily achieved by the provision of the rubber cushions 28, as previously described. The earth cable 36a, FIG. 5, leaving the battery is connected to one of the pivots 20 which is in conducting connection, via the lever 22 and upright 18 of the windshield, with the stirrup 36 of the corresponding lacing latch 37. The other part 35 of this latch is in conductive connection with the body 10 on which it is directly fixed. Under these conditions, the earth current passing from the part 34 to the part 35 of the latches via the stirrup 36 is interrupted when the latches are not closed, which makes starting of the engine impossible.

At the same time, the opening of the latches which necessarily precedes operation of the superstructure to the collapsed position, automatically breaks the current in the case where the user may by mistake have left the ignition key.

As has been stated, the vehicle described and shown herein is of the "coupe" type. In the same way, one can produce a "sedan" type vehicle by replacing the opaque quarter panels 16 by windows the frame of which has the characteristics of the panels 16. It will be seen that, without going outside of the scope of the invention, and with the provision of the necessary constructional arrangements, a vehicle with four doors can be constructed embodying the improvements of the invention.

While the lightness of the superstructure may permit it to be operated easily by direct action, hydraulic, pneumatic or electric actuating or control means may be utilized, as will be understood by those skilled in the art.

In the foregoing the invention has been described in reference to a specific illustrative device. It will be evident, however, that variations and modifications, as well as the substitution of equivalent parts for those shown for illustration, may be made without departing from the broader scope and spirit of the invention as encompassed by the appended claims. The specification and drawing are accordingly to be regarded in an illustrative rather than in a restrictive sense.

I claim:

1. The combination with a collapsible vehicle of the type described having a body, two opposite doors therein fitted with free-standing door windows operable between raised and lowered positions, a hood extending from the front of and a driver's seat disposed behind said body; of a collapsible superstructure comprising a windshield and a rear window both having uprights and being of the same vertical dimensions, and a roof, means pivotally connecting the uprights of said windshield and said rear window at their lower ends to said body in front of and behind, respectively, the openings defined by said doors, further means pivotally connecting the front and rear ends of said roof to the upper ends of the uprights of said windshield and said rear window, respectively, to form a jointed parallelopiped by said superstructure in its extended position and to enable the same to be operated to a collapsed position with said windshield horizontally overlying said hood, with said roof resting upon said windshield, and with said rear window horizontally overlying said seat behind said windshield, and a pair of panels connected to the uprights of said rear window, to occupy the spaces between said rear window and the door windows in the closed position and to act as abutment for said superstructure in the extended position.

2. In a collapsible vehicle as claimed in claim 1, said panels contructed in the form of auxiliary windows intermediate said rear window and the door windows in the raised position.

3. The combination with a collapsible vehicle of the type described having a body, at least two opposite doors therein fitted with free-standing door windows operable between lowered and raised positions, a hood extending from the front of and a driver's seat disposed behind said body; of a collapsible superstructure comprising a windshield and a rear window both having uprights and being of the same vertical dimensions, and a roof, means pivotally mounting said windshield and said rear window at their lower parts to said body in front of and behind, respectively, the openings defined by said doors, further means pivotally mounting the front and rear parts of said roof to the upper ends of said windshield and rear window, respectively, to form a jointed parallelopiped by said superstructure in its open position and to enable the same to be operated to a collapsed position with said windshield horizontally overlying said hood, with said roof resting upon said windshield, and with said rear window horizontally overlying said seat behind said windshield, latching means having a first part secured to a part of said superstructure and a second part secured to said body, to lock said superstructure in the open position, an electrical battery, means to electrically isolate said superstructure from said body, and a ground lead from said source connected to said part of said superstructure, whereby to close the ground circuit of said battery by said latching means in the open position and to interrupt said circuit in the collapsed position of the vehicle.

4. The combination with a collapsible vehicle of the type described including a body having at least two opposite doors fitted with free-standing door windows operable between lowered and raised positions; of a collapsible superstructure comprising a windshield and a rear window both of like vertical dimensions, and a roof, means pivotally mounting said windshield and said rear window at their lower parts to said body in front of and behind, respectively, said doors, further means pivotally connecting the front and rear parts of said roof to the upper parts of said windshield and said rear window, respectively, whereby to form a jointed parallelopiped in the extended position of said superstructure, with said windshield and said rear window inclined rearwardly in respect to the direction of forward movement of the vehicle, and to enable said superstructure to be operated to a collapsed position with said windshield horizontally overlying the front of said body, with said roof resting upon said windshield and with said rear window overlying the rear of said body behind said windshield, and side panels affixed to said rear window, to occupy the spaces between said rear window and said door windows in the raised position and to act as abutments for said superstructure and to fix the angular inclination of said windshield and said rear window in the open position of said superstructure, said panels adjoining the inside of said doors in the collapsed position of said superstructure.

References Cited by the Examiner
UNITED STATES PATENTS 1,215,407   2/1917   Polson _____ 296—93
2,382,635   8/1945   Humer _____ 296—107

FOREIGN PATENTS 351,846   3/1961   Switzerland.
24,410   4/1919   Denmark.
117,765   8/1918   Great Britain.
843,638   8/1960   Great Britain.

BENJAMIN HERSH, *Primary Examiner.*

P. GOODMAN, *Assistant Examiner.*